Figure 1:
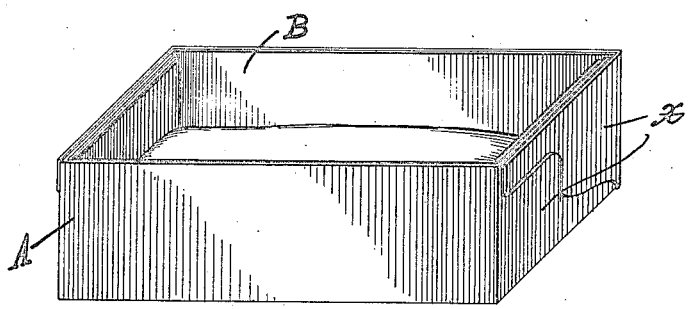

E. G. GEREKE.
BAKING UTENSIL.
APPLICATION FILED JUNE 16, 1921.

1,437,512.

Patented Dec. 5, 1922.

INVENTOR
Edward G. Gereke
BY Bakewell & Church
ATTORNEYS

Patented Dec. 5, 1922.

1,437,512

UNITED STATES PATENT OFFICE.

EDWARD G. GEREKE, OF ST. LOUIS, MISSOURI.

BAKING UTENSIL.

Application filed June 16, 1921. Serial No. 478,141.

*To all whom it may concern:*

Be it known that I, EDWARD G. GEREKE, a citizen of the United States, residing at St. Louis, Missouri, have invented a certain new and useful Improvement in Baking Utensils, of which the following is a full, clear, and exact description, such as will enable others skilled in the art to which it appertains to make and use the same.

This invention relates to a device that is adapted to be used as a container for dough or other material that is being baked and also as a wrapper for keeping the baked article clean until it is used or in which the baked article can be delivered to the consumer.

The main object of my invention is to provide a device of the character referred to that is inexpensive to manufacture and of such construction that it can be removed quickly and easily from the baked article which it contains.

Another object is to provide a baking utensil that consists of an outer shell formed of cardboard or other material of a similar nature and an inner lining for said shell consisting of parchment paper or other suitable material combined with said shell in such a manner that it will cling tightly to the shell, and thus virtually form a part of same when the utensil is filled and first placed in an oven, but will automatically separate or detach from said shell as the baking operation proceeds, thus permitting the outer shell to be removed quickly and easily and without the necessity of first cutting the outer shell or inner lining that surrounds the baked article.

And still another object is to provide a cardboard baking utensil that has the desirable characteristics of a folding cardboard box, namely, low cost of manufacture and compactness for shipment and storage. Other objects and desirable features of my invention will be hereinafter pointed out.

To this end I have devised a baking utensil that consists of a box, receptacle or other container of any preferred shape, formed preferably of cardboard or other sheet material of a similar nature, and an inner lining for said container formed of parchment paper or other suitable material that is temporarily secured to the inner side of said container by a substance which will evaporate, be absorbed or disappear when the utensil is subjected to heat. Paraffin is a substance well adapted for the purpose mentioned, as it holds the inner lining in snug engagement with the outer shell of the utensil while the utensil is being filled and at the first part of the baking operation when it is necessary for the inner lining to maintain substantially the same shape as the shell, and it permits the inner lining to separate automatically from the shell as the baking operation proceeds. It is immaterial how the paraffin or other temporary securing substance is applied and the particular shape and construction of the shell of the utensil are immaterial. I prefer, however, to construct the utensil similar to a folding cardboard box, so that a large number of utensils can be shipped or stored in a small space. When constructed in this manner it is preferable to attach a sheet of parchment paper or other suitable material to a sheet of cardboard or the like by means of paraffin, thus forming a blank, and then cut and score said blank in such a way that it can be subsequently formed into a baking utensil consisting of an outer shell having an inner lining that virtually forms part of same, but which will separate or become detached from the shell when the utensil is subjected to heat.

Figure 2:
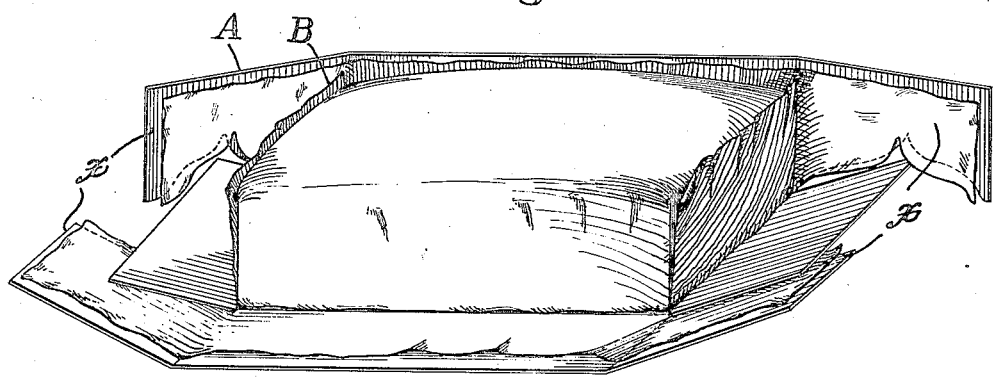

Figure 1 of the drawings is a perspective view of a baking utensil constructed in accordance with my invention, showing how the inner lining adheres to the outer shell of the utensil when the dough or other material to be baked is first placed in the utensil; and Figure 2 is a perspective view, showing the inner lining separated from the shell and the inner lining and shell partly stripped off the baked article.

Referring to the drawings, A designates the outer shell of my baking utensil which is preferably composed of cardboard or other similar sheet material, and B designates a piece of parchment paper or other suitable material that lines the interior of the shell A.

It is essential that the inner lining B conform accurately to the shape of the shell A when the wet dough is first placed in the utensil and also during the first part of the baking operation, for if the inner lining wrinkles or sags over the dough, the appearance of the article at the completion of the baking operation will be marred. It is also essential that the inner lining be free from the shell or not attached throughout its entire area to the shell when the baking operation is completed. Therefore, I attach the inner lining B to the shell A by means of paraffin or some other substance that will secure said elements together, and thus maintain the inner lining in proper shape when the utensil is filled and first placed in the oven, but which will permit the inner lining to separate or detach from the shell when the utensil is subjected to heat, due to the evaporation of said substance or the absorption of same by the outer shell A of the utensil. Moreover, this method of connecting the inner lining B to the outer shell A enables the outer wrapper on the baked article, namely, the cardboard shell A, to be pulled or stripped off the inner lining B easily and without the necessity of first cutting either the outer shell or inner lining.

In the embodiment of my invention herein illustrated the outer shell A is constructed like an ordinary folding cardboard box and the inner lining B is combined with the sheet of cardboard from which said outer shell is formed before said sheet is cut, scored and folded, the preferred method being to arrange a sheet of parchment paper or the like upon a sheet of cardboard or other suitable material, connect said sheets together by paraffin or some other substance of a similar nature so as to form a blank and then fold said blank and interlock the portions $x$ of same together so as to form a box or container capable of holding dough or other material that is to be baked.

By constructing the utensil in this manner I am able to manufacture it at a very low cost, owing to the fact that the inner lining B is arranged in operative position and combined with or attached to the outer shell A in a single operation when the material constituting said inner lining and shell is flat or in the form of a sheet. Moreover, the outer shell of such a utensil can be stripped off the inner lining that encases the baked article without first cutting said inner lining or shell to separate them.

Having thus described my invention, what I claim as new and desire to secure by Letters Patent is:

1. A baking utensil consisting of an outer shell and an inner lining for said shell connected to same by a means that will permit said elements to separate automatically when the utensil is subjected to heat.

2. A baking utensil, comprising a receptacle provided with an inner lining consisting of a sheet of impervious material that is connected to said receptacle by an adhesive substance whose efficiency as an adhesive will be destroyed when the utensil is subjected to heat.

3. A baking utensil, comprising an outer shell formed of cardboard or the like, and a lining of parchment paper or the like secured to the inner side of said shell by a substance that will permit the inner lining to separate automatically from the shell when the utensil is subjected to heat.

4. A baking utensil, comprising an outer shell formed of cardboard or the like, an inner lining for said shell formed of parchment paper or the like, and means that holds said inner lining in snug engagement with the shell when the utensil is first placed in an oven but which insures said elements separating automatically as the baking operation proceeds.

5. A combined baking utensil and wrapper for baked articles composed of two superimposed sheets folded in such a way as to form a receptacle having an inner lining that adheres tightly to the side walls of the outer shell of the receptacle when the utensil is first placed in an oven but which will separate automatically from said shell during the baking operation.

6. A baking utensil, comprising an outer shell of cardboard of similar construction to a folding box, and an inner lining for said shell connected with same by a substance which will be rendered ineffective for securing said lining to said shell when the utensil is subjected to heat.

7. A baking utensil formed from a folded blank provided with interlocking portions and composed of two sheets of material combined or connected together by a substance which, upon being subjected to heat, will permit the inner and outer portions of the side walls of the utensil to separate.

EDWARD G. GEREKE.